United States Patent [19]
Cedarberg, III

[11] Patent Number: 6,142,486
[45] Date of Patent: Nov. 7, 2000

[54] MOUNTING ARRANGEMENT FOR RETAINER COLLET ASSEMBLY

[75] Inventor: John F. Cedarberg, III, Eagan, Minn.

[73] Assignee: Cedarberg Industries, Inc., Eagan, Minn.

[21] Appl. No.: 09/338,895

[22] Filed: Jun. 23, 1999

Related U.S. Application Data

[63] Continuation-in-part of application No. 08/806,308, Feb. 26, 1997, Pat. No. 5,921,561.

[51] Int. Cl.$^7$ .......................... A47G 29/00; F16M 13/02; B23B 31/117
[52] U.S. Cl. .......................... 279/103; 248/160; 248/314; 248/692; 403/361; 408/226
[58] Field of Search .......................... 279/103; 248/160, 248/314, 315, 276.1, 692; 403/361, 409.1; 408/226, 239 A

[56] References Cited

U.S. PATENT DOCUMENTS

| | | |
|---|---|---|
| 668,286 | 2/1901 | Freese . |
| 2,138,012 | 4/1938 | Perr . |
| 2,438,797 | 3/1948 | Bagge . |
| 3,411,796 | 11/1968 | Decker . |
| 3,549,159 | 12/1970 | Kroener . |
| 4,681,056 | 7/1987 | Friedle et al. . |
| 4,722,634 | 2/1988 | Malish ................................. 403/361 |
| 5,699,988 | 12/1997 | Boettger et al. ..................... 248/276.1 |
| 5,921,561 | 7/1999 | Cedarberg, III . |

*Primary Examiner*—Steven C. Bishop
*Attorney, Agent, or Firm*—Haugen Law Firm PLLP

[57] ABSTRACT

The present invention is a combination of a flexible arm with a collet assembly. The assembly includes an elongated flexible arm or tube with a collet at one end and a releasable mounting assembly integral with the opposed end. The collet is arranged to grippingly receive and retain a tubular work item therein, such as a flashlight, magnifying glass or lense, clamping retainer, or the like, with the work device having a circular cross-section and in the form of a tube, sleeve, cylindrical shaft, or the like. The releasable retaining mechanism includes a prong and socket assembly, with the prong portion being preferably integral with the flexible arm, and with the socket portion being adapted to releasably retain the prong and accordingly the flexible arm and collet assembly. The collet is provided with an outer external ring which slidingly engages with the internal gripping fingers, thereby simplifying the attachment to the working device.

3 Claims, 3 Drawing Sheets

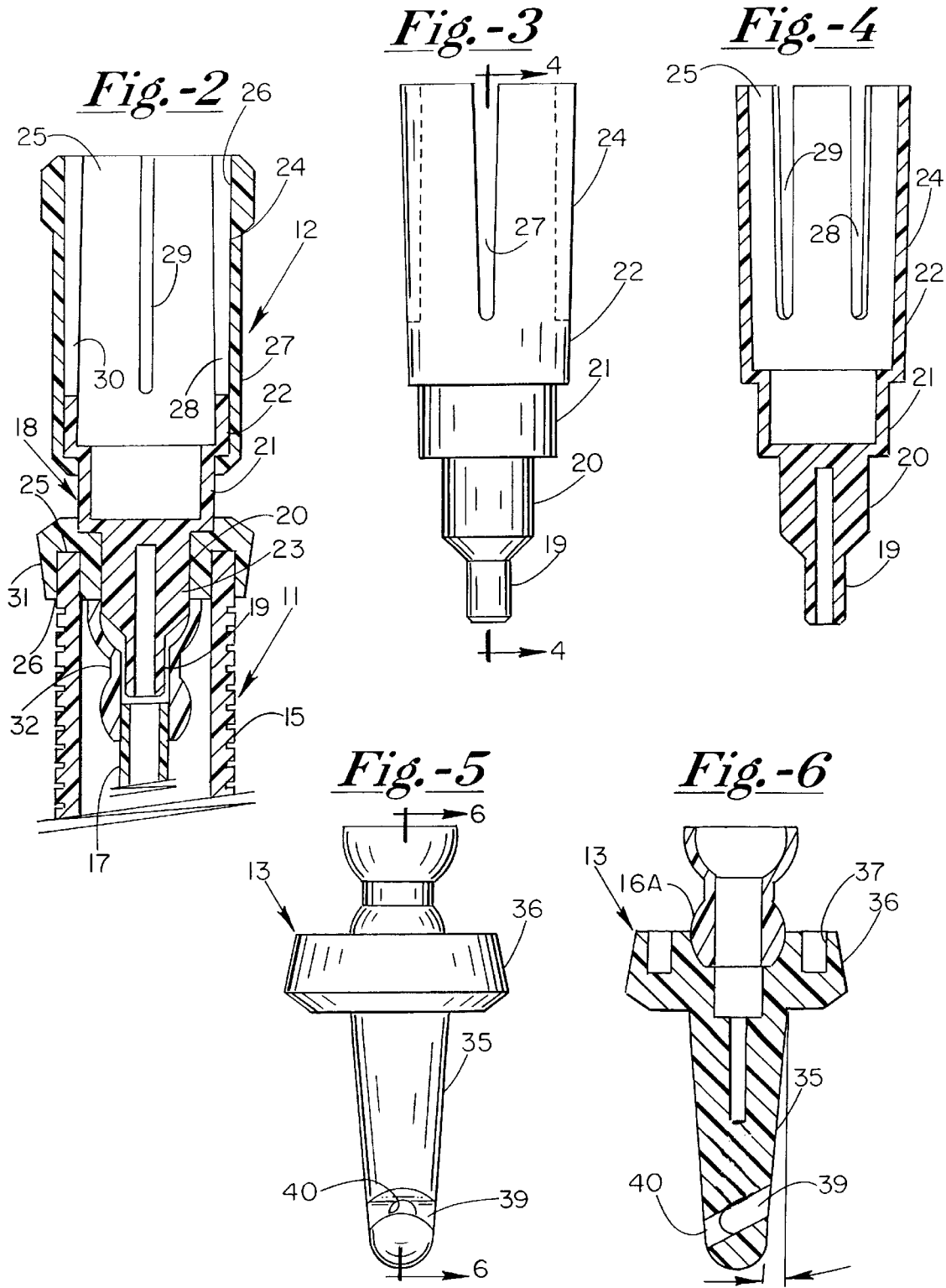

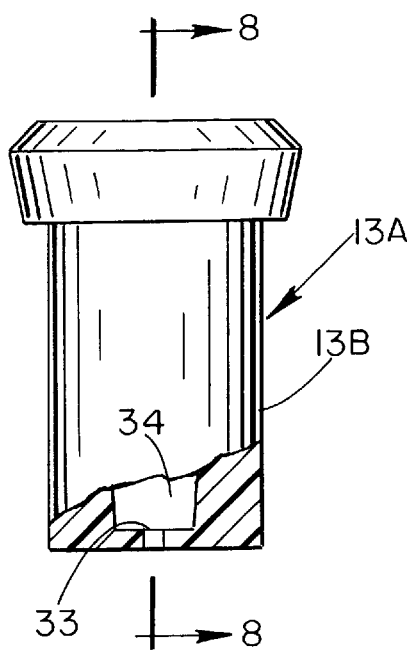
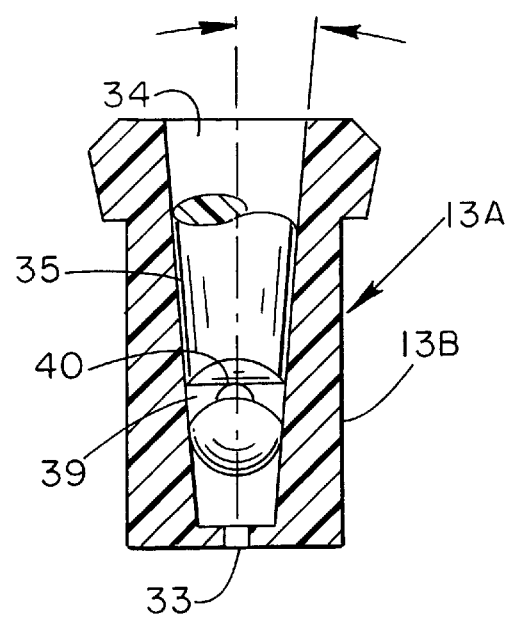

MOUNTING ARRANGEMENT FOR RETAINER COLLET ASSEMBLY

CROSS-REFERENCE TO RELATED APPLICATION

This is a Continuation-in-Part of my application Ser. No. 08/806,308, filed Feb. 26, 1997, now U.S. Pat. No. 5,921,561, entitled "COLLET ASSEMBLY" and assigned to the same assignee as the present application.

I. FIELD OF THE INVENTION

This invention relates generally to the combination of a novel mounting arrangement for a device retaining collet assembly and more importantly to a mounting arrangement for quickly securing and/or releasing the collet assembly from a pre-arranged or predetermined stationary mounting point.

II. DISCUSSION OF THE PRIOR ART

In the past, various types of flexible arm holders have been utilized for conveniently positioning and retaining such devices as light sources, oil spray or mist systems for machining operations, magnifying glasses or lenses, or the like. These flexible arm holders have typically been provided with either a stationary pedestal secured to a mounting surface, or alternatively have been provided with a free-standing pedestal or base. Each feature has its advantages and accompanying disadvantages due to the frequent desire to either reposition the flexible holder, or to remove the holder as needed for temporary use and/or attention elsewhere. The present invention provides a safe, reliable attachment system which utilizes the advantageous features of a stationary system, while permitting the flexibility of a portable or free-standing system, with the overall arrangement being specifically adapted for use with a flexible arm mechanism having a collet retainer at one end, and the releasable attachment arrangement at the opposed or distal end.

SUMMARY OF THE INVENTION

The present invention includes a releasable holder or coupling device for use in the combination, the coupling comprising a prong and socket assembly, with the prong portion being integral with and attached to the distal end of the flexible arm mechanism, and with the socket portion being separate and designed to receive the prong and also having a bore formed therein to receive a fastener for attachment to a base surface. The prong comprises a body with a generally conical configuration tapering along at a desired cone angle from the distal adjacent end of the flexible arm toward a tip or terminal end. A slot and bore means are formed along the conical body, with the slot extending across the entire diameter of the cone in one dimension, and with the cross-axis of the slot being arranged normal to the axis of a smaller diameter bore. In this arrangement, the slot axis and the cross-bore permit the free flexible arm and collet assembly to be conveniently hung on a hanger, hook or nail, while the socket means may remain positionably coupled or attached to a surface at a remote and normally desired working location. By way of example, the socket may be mounted on the surface of a workbench, thereby permitting the flexible arm arrangement to be utilized and/or removed as desired. As an added feature, the socket may be coupled to a base pad, such as a magnetic base pad, to permit additional freedom and flexibility of positioning of the flexible arm/collet assembly.

Therefore, it is a primary object of the present invention to provide a mounting system for a flexible arm/collet holder assembly so as to provide an added degree of versatility in positionably retaining the flexible arm holder at any one or more desired locations.

Other and further objects of the present invention will become apparent to those skilled in the art upon a study of the following specification, appended claims, and accompanying drawings.

IN THE DRAWINGS

FIG. 2 is a detail sectional view of the collet portion of the flexible arm, with this figure being shown on a slightly enlarged scale;

FIG. 3 is a side elevational view illustrating the detail of a portion of the collet assembly;

FIG. 4 is a sectional view taken along the line and in the direction of the arrows 4—4 of FIG. 3;

FIG. 5 is a detail elevational view of the prong portion of the prong and socket assembly, with this view being on a scale consistent with that of FIGS. 3 and 4;

FIG. 6 is a sectional view taken along the line and in the direction of the arrows 6—6 of FIG. 5;

FIGS. 7 is a detail elevational view illustrating the socket portion; and

FIG. 8 is a cross-sectional view taken along the line and in the direction of the arrows 8—8 of FIG. 7.

DESCRIPTION OF THE PREFERRED EMBODIMENT

Figure 1:
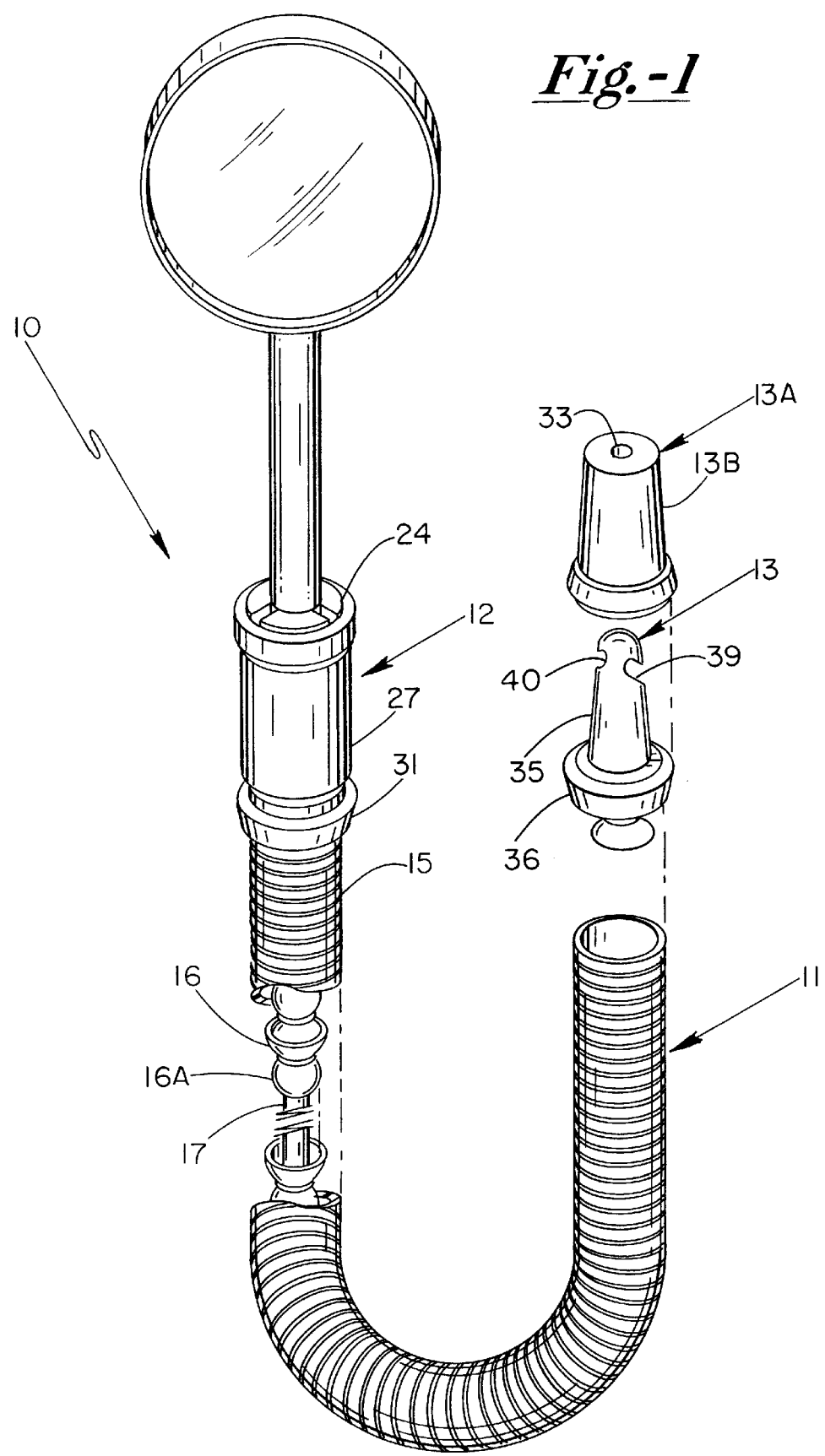
FIG. 1 is a perspective view of the combination of the present invention, illustrating the flexible arm/collet portion along with the prong and socket portion, and with the prong and socket being shown in exploded configuration, and with a portion of the shroud and ball-and-socket core assembly being shown cut away.

With attention now being directed to the drawings, the entire combination of the flexible arm and the prong and socket assembly generally designated 10 comprises a flexible arm component shown generally at 11, a collet component at 12, and a prong and socket coupling device, the prong for the combination being shown generally at 13 and the socket or prong receiver at 13A. The flexible arm/collet device is described in detail in copending application Ser. No. 08/806,308, filed Feb. 26, 1997, now U.S. Pat. No. 5,921,561, entitled "COLLET ASSEMBLY", and that entire disclosure is incorporated herein by reference. Essentially, the distal end of the flexible arm portion is utilized to couple the collet/arm assembly to the prong and socket coupling device, as will be described in detail hereinbelow.

The flexible arm 11 comprises a tubular shroud 15 which encloses a tubular ball and socket assembly 16 therewithin. A length of plastic tubing 17 is positioned within the core of the ball and socket assembly 16 for stability. Ball and socket assemblies of the type illustrated herein, along with the enclosed tubing have been employed in the past in a variety of applications, including such an application in an oil mist spray device under the trade designation "Easy Mist" available from Cedarberg Industries, Inc. of Eagan, Minnesota. The "Easy Mist" product has been available commercially since at least as early as about 1985, and hence the structures are well known in the art. Shroud 15 is preferably a length of vinyl or nylon tubing of the type employed commercially in the automotive, marine, and other related industries, and is available in a wide variety of sizes, lengths and configurations. A square shouldered configuration is shown in the current application.

The collet assembly 12 is a generally tubular member, and as illustrated in FIG. 2, the body shown generally at 18 includes an inner core with four individual segments 19, 20, 21 and 22, each having a different diameter. The four segments are preferably integral, one with another, and fabricated from a molded plastic resin material. The diameters increase in size from the smallest or internal segment 19 to the largest segment 22. The two segments of smaller diameter, 19 and 20, form a plug portion as at 23. Plug 23 is utilized to secure or couple collet assembly 12 to the inner ball and socket assembly and the end cap portion of the flexible arm 11. A bore is preferably formed in plug member 23 in order to provide or accommodate some flexure of plug portion in the overall assembly operation.

The two larger segments 20 and 21 of member 18 form a flexible device retaining receptacle or chamber 25. This chamber 25, open at its proximal end as at 26 is preferably cylindrical and of a size which will conveniently accept the devices of interest. In other words, various sizes of collet chambers may be employed as indicated by the immediate application for the assembly. Chamber 25 of collet 12 is enclosed by a slotted sleeve segment 24, in order to provide flexure for gripping the article or workpiece being held. The slots are designated 27-30 inclusive. Sleeve 27 slides axially over member 18.

A proximal end cap is illustrated at 31, and is used for securing plug portion 23 to the assembly and for coupling to shroud 15 forming flexible arm 11. Additionally, the distal tip end of plug 23, as defined by segment 19, is designed to fit within the proximal end socket of the ball and socket assembly at 32. Also, as indicated, liner tube 17 has its proximal end located or positioned adjacent the ultimate ball and socket member in assembly 16.

Attention is now specifically directed to FIGS. 5 and 6 of the drawings illustrating the details of the prong 13 which comprises a conical body 35 having an end cap portion 36 molded integrally therewith. End cap portion 36 is utilized to couple prong body 35 to the distal end of flexible arm 11, including both the ball and socket assembly 32 and shroud 15. In this connection, tubular end cap portion 36 has an annular groove formed therein as at 37 for attachment to shroud 15, along with an inner bore for enclosing and grippingly receiving the distal end of ball segment 16A of ball and socket assembly 16. Such attachment mechanisms have been employed in the past, and are well known to those knowledgeable in the art.

The body 35 of conical member 13 is a locking taper, tapered at a cone angle matching that of socket 34, preferably at an angle of between 0° and 10°, preferably at approximately 3°, as indicated by the double-ended arrow in FIG. 6. As illustrated in FIGS. 5 and 6, prong 35 has an angular slot formed therein as at 39, with slot 39 being used to receive a hanger member such as a nail, hook, or the like as required. Additionally, bore 40 is formed adjacent the distal tip end of prong 35 with the axis of bore 40 extending along and being in continuation with the elongated axis of slot 39. The orientation of these axes 30 is helpful in utilization of the device.

With attention now being directed to FIGS. 7 and 8 of the drawings, socket 13A comprises a body 13B having a bore 33 formed adjacent the base, along with a tapered or conical counterbore as shown generally at 34, for snugly receiving prong 13 therewithin. The locking taper of chamber 34 is approximately less than about 4° as indicated by the double-arrow in FIGS. 5, 6 and 8.

With continued reference to socket member 13A, bore 33 may be utilized to receive a mounting screw, or alternatively the extension of a mounting pad such as a magnetic mounting pad (not shown), or the like for ease of positionably retaining the prong receiving socket at a desired location or placement. With the angles of taper of prong 13 and counterbore 34 being matched, socket 34 mates with the outer surface of prong 13. In this connection, by forcing prong 13 into conical receiver bore 34, the resulting interference fit provides for suitable gripping or retaining action between the prong and the receiver socket. The selection of the locking taper for the cone angle at approximately less than 4° provides the optimum degree of retentive forces between the contacting surfaces.

As an alternative structure, the prong and socket releasable mounting arrangement may be utilized in a reverse arrangement, with the prong being stationary, and with the socket portion being secured to the flexible arm. Although such reverse configurations are possible, it is generally preferable to have the prong portion coupled to the flexible arm, as illustrated hereinabove.

It will be appreciated that other various modifications may be made in the structure disclosed, with these modifications being, of course, encompassed by the scope of the appended claims.

What is claimed is:

1. In combination, a flexible arm having a collet assembly at one end and a prong and socket coupling device at the other, with a prong portion being attached to the flexible arm assembly at a distal end thereof, and with a socket portion having bore means formed therein for attachment to a base surface; said prong and socket coupling device being characterized in that:

(a) said prong portion comprises a body having a generally conical configuration tapering along a cone angle from said distal end attachment toward a tip terminal end, slot and bore means formed along said conical prong body, with an axis of said bore means extending in continuation with an elongated axis of the slot means, and with said cone angle of said tapered prong portion being a locking taper from between 0° and 10°;

said socket portion of the coupling device having opposed ends with an axial fastener receiving attachment bore at one end and a conical counterbore formed therein from the opposed end for receiving said prong in mating relationship therewithin.

2. The combination as in claim 1 wherein said cone angle is approximately 4°.

3. The combination of claim 1 being particularly characterized in that said flexible arm comprises an elongated ball and socket assembly disposed within shroud means, and wherein said prong has a base pad for receiving one end of said ball and socket assembly therewithin.

* * * * *